United States Patent
Klemen et al.

(10) Patent No.: US 7,018,318 B2
(45) Date of Patent: Mar. 28, 2006

(54) SEVEN-SPEED TRANSMISSION

(75) Inventors: Donald Klemen, Carmel, IN (US); Richard L. Wagner, Quincy, IN (US)

(73) Assignee: General Motors Corporation, Detroit, MI (US)

( * ) Notice: Subject to any disclaimer, the term of this patent is extended or adjusted under 35 U.S.C. 154(b) by 143 days.

(21) Appl. No.: 10/819,448

(22) Filed: Apr. 7, 2004

(65) Prior Publication Data

US 2005/0227806 A1  Oct. 13, 2005

(51) Int. Cl.
*F16H 3/62* (2006.01)

(52) U.S. Cl. .................... 475/275; 475/284
(58) Field of Classification Search ............. 475/275, 475/284, 296, 311, 323
See application file for complete search history.

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,672,987 B1 * | 1/2004 | Raghavan et al. | 475/269 |
| 6,716,131 B1 * | 4/2004 | Usoro et al. | 475/276 |
| 6,910,985 B1 * | 6/2005 | Ishimaru et al. | 475/275 |
| 6,910,986 B1 * | 6/2005 | Wittkopp | 475/275 |
| 6,949,048 B1 * | 9/2005 | Bucknor et al. | 475/275 |

FOREIGN PATENT DOCUMENTS

JP  2-154840  * 6/1990

* cited by examiner

*Primary Examiner*—Ha Ho
(74) *Attorney, Agent, or Firm*—Christopher DeVries

(57) ABSTRACT

A seven-speed transmission includes an input shaft, an output shaft, and three planetary gear sets. An interconnecting member continuously connects members of the second and third planetary gear sets. Six torque-transmitting mechanisms are provided between the planetary gear sets and a transmission housing. The six torque-transmitting mechanisms are engaged in combinations of two to establish seven forward speed ratios and a reverse speed ratio between the input shaft and the output shaft. A unique engagement sequence is provided for the torque-transmitting mechanisms to minimize sun gear loading.

18 Claims, 3 Drawing Sheets

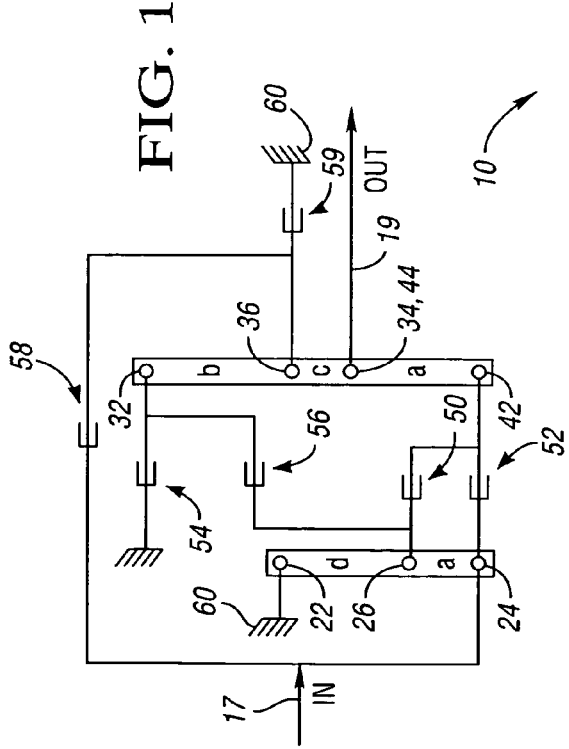
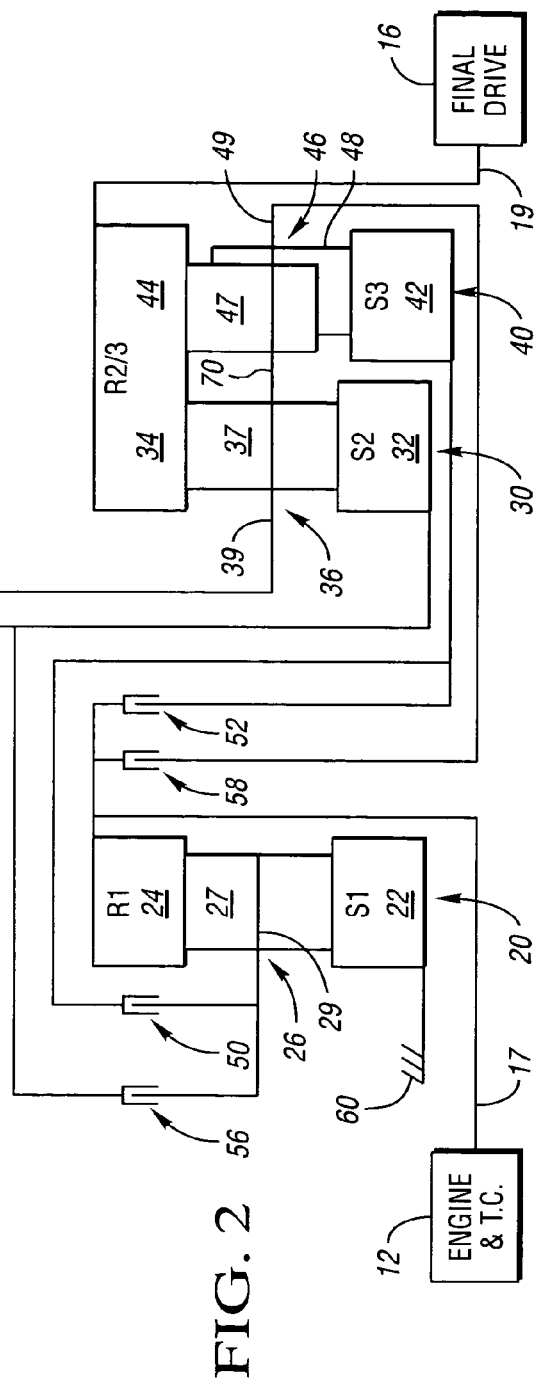
FIG. 1
FIG. 2

FIG. 3a

| GEAR STATE | GEAR RATIO | RATIO STEPS |
|---|---|---|
| Rev | -2.612 | -0.63 |
| N | | |
| 1st | 4.129 | 1.62 |
| 2nd | 2.548 | 1.60 |
| 3rd | 1.593 | 1.37 |
| 4th | 1.166 | 1.17 |
| 5th | 1.000 | 1.24 |
| 6th | 0.808 | 1.31 |
| 7th | 0.617 | |

OVERALL RATIO: 6.69

| | CLUTCHING ELEMENTS (NAME/TYPE/GEAR NODE CONNECTION) | | | | | |
|---|---|---|---|---|---|---|
| | (50) CLUTCH PC1 S3 | (52) CLUTCH R1 S3 | (54) CLUTCH S2 GROUND | (56) CLUTCH PC1 S2 | (58) CLUTCH R1 PC3 | (59) CLUTCH PC2 GROUND |
| Rev | | | | X | | X |
| N | | | | | | O |
| 1st | X | X | | | | X |
| 2nd | | X | X | | | X |
| 3rd | | X | | X | | |
| 4th | | X | | | | |
| 5th | | | | | X | |
| 6th | | | | X | X | |
| 7th | | | X | | X | |

FIG. 3b

| R/S RATIOS | R1/S1 | R2/S2 | R3/S3 |
|---|---|---|---|
| | 79/49 | 79/49 | 79/31 |
| | 1.61 | 1.61 | 2.55 |

FIG. 4a

| GEAR STATE | GEAR RATIO | RATIO STEPS | (50) CLUTCH PC1 S3 | (52) CLUTCH R1 S3 | (54) CLUTCH S2 GROUND | (56) CLUTCH PC1 S2 | (58) CLUTCH R1 PC3 | (59) CLUTCH PC2 GROUND |
|---|---|---|---|---|---|---|---|---|
| Rev | -2.622 | -0.87 | | | | x | | x |
| N | | | | | | | | o |
| 1st | 3.026 | | x | | | | | x |
| 2nd | 2.026 | 1.494 | | x | | | | x |
| 3rd | 1.372 | 1.476 | | x | x | | | |
| 4th | 1.096 | 1.249 | | x | | x | | |
| 5th | 1.000 | 1.098 | | | | | x | x |
| 6th | 0.842 | 1.188 | | | | x | x | |
| 7th | 0.637 | 1.321 | | | x | | x | |

CLUTCHING ELEMENTS (NAME/TYPE/GEAR NODE CONNECTION)

OVERALL RATIO: 4.75

FIG. 4b

R/S RATIOS

| R1/S1 | R2/S2 | R3/S3 |
|---|---|---|
| 79/39 | 79/45 | 79/39 |
| 2.02 | 1.75 | 2.02 |

SEVEN-SPEED TRANSMISSION

TECHNICAL FIELD

The present invention relates to a transmission having three planetary gear sets that are controlled by six torque-transmitting mechanisms to provide seven forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft) transmissions were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

Seven-speed transmissions are disclosed in U.S. Pat. No. 4,709,594 to Maeda; U.S. Pat. No. 6,053,839 to Baldwin et. al.; and U.S. Pat. No. 6,083,135 to Baldwin et. al. Seven-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

A seven-speed transmission is provided using minimal content, and in a manner which achieves desirable ratio steps and a wide overall ratio, and minimizes sun gear loading to enhance durability.

Specifically, the multi-speed transmission includes an input shaft, an output shaft, and a planetary gear arrangement having first, second and third planetary gear sets. Each planetary gear set has first, second and third members. The input shaft is continuously interconnected with the first member of the first planetary gear set, and the output shaft is continuously connected with the first member of the third planetary gear set. The first member of the second planetary gear set is integrally connected with the first member of the third planetary gear set. The third member of the first planetary gear set is continuously connected with a transmission housing.

An interconnecting member continuously connects the second member of the second planetary gear set with the second member of the third planetary gear set. A first torque-transmitting mechanism selectively connects the second member of the first planetary gear set with the third member of the third planetary gear set. A second torque-transmitting mechanism selectively connects the first member of the first planetary gear set with the third member of the third planetary gear set. A third torque-transmitting mechanism selectively connects the third member of the second planetary gear set with the transmission housing. A fourth torque-transmitting mechanism selectively connects the second member of the first planetary gear set with the third member of the second planetary gear set. A fifth torque-transmitting mechanism selectively connects the first member of the first planetary gear set with the second member of the third planetary gear set. A sixth torque-transmitting mechanism selectively connects the second member of the second planetary gear set with the transmission housing.

The first, second, third, fourth, fifth and sixth torque-transmitting mechanisms are engaged in combinations of two to establish seven forward speed ratios and a reverse speed ratio between the input shaft and the output shaft. A reverse speed ratio is established with the engagement of the fourth and sixth torque-transmitting mechanisms; a first forward speed ratio is established with the engagement of the first and sixth torque-transmitting mechanisms; a second forward speed ratio is established with the engagement of the second and sixth torque-transmitting mechanisms; a third forward speed ratio is established with the engagement of the second and third torque-transmitting mechanisms; a fourth forward speed ratio is established with the engagement of the second and fourth torque-transmitting mechanisms; a fifth forward speed ratio is established with the engagement of the second and fifth torque-transmitting mechanisms; a sixth forward speed ratio is established with the engagement of the fourth and fifth torque-transmitting mechanisms; and a seventh forward speed ratio is established with the engagement of the third and fifth torque-transmitting mechanisms. This engagement sequence minimizes sun gear loading and to improve gear and bearing life.

Preferably, each of the first members is a ring gear, each of the second members is a planet carrier assembly member, and each of the third members is a sun gear.

The first and second planetary gear sets are simple planetary gear sets, and the third planetary gear set is a compound planetary gear set.

The first, second, fourth and fifth torque-transmitting mechanisms are rotating clutches, and the third and sixth torque-transmitting mechanisms are brakes.

In one embodiment, the ring gear of the first planetary gear set has 79 teeth; the sun gear of the first planetary gear set has 49 teeth; the ring gear of the second planetary gear set has 79 teeth; the sun gear of the second planetary gear set has 49 teeth; the ring gear of the third planetary gear set has 79 teeth; and the sun gear of the third planetary gear set has 31 teeth. In another embodiment, the ring gear of the first planetary gear set has 79 teeth; the sun gear of the first planetary gear set has 39 teeth; the ring gear of the second planetary gear set has 79 teeth; the sun gear of the second planetary gear set has 45 teeth; the ring gear of the third planetary gear set has 79 teeth; and the sun gear of the third planetary gear set has 39 teeth. Different tooth counts may be implemented to achieve ratios.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1 shows a lever diagram of a transmission in accordance with the invention;

FIG. 2 shows a stick diagram corresponding with the lever diagram of FIG. 1;

FIGS. 3a and 3b show a truth table and a ring gear/sun gear ratio table, respectively, corresponding with the diagrams of FIGS. 1 and 2; and FIGS. 4a and 4b show a truth table and a ring gear/sun gear ratio table, respectively, for an alternative embodiment of the invention.

DESCRIPTION OF THE PREFERRED EMBODIMENTS

FIG. 1 shows a lever diagram of a transmission in accordance with the invention. The mechanisms will be described with specific reference to the stick diagram of FIG. 2, wherein like reference numerals refer to like components from FIG. 1. Similarly structured transmissions are described in U.S. Provisional Application 60/480,956, filed Jun. 24, 2003, and related co-pending U.S. Ser. No. 10/784,641 filed Feb. 23, 2004, both of which are hereby incorporated by reference in their entirety.

Referring to FIG. 2, there is shown a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 (the first planetary gear set) includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 (the second planetary gear set) includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 (the third planetary gear set) includes a sun gear member 42, a ring gear member 44, and a planetary gear set 46. The ring gear member 34 is integrally connected with the ring gear member 44. In other words, the ring gear members 34, 44 are formed by a single elongated ring gear member, or are connected together by a sleeve to which both ring gear members 34, 44 are splined. The planet carrier assembly member 46 includes a plurality of pinion gears 47, 48 rotatably mounted on a carrier member 49. The pinion gears 47 are disposed in meshing relationship with the ring gear member 44, and the pinion gears 48 are disposed in meshing relationship with the sun gear member 42. The pinion gears 47, 48 also mesh with each other.

The planetary gear arrangement 18 also includes six torque-transmitting mechanisms. The torque-transmitting mechanisms 50, 52, 56, 58 are rotating torque-transmitting mechanisms, commonly termed clutches. The torque-transmitting mechanisms 54, 59 are stationary type torque-transmitting mechanisms, commonly termed brakes or reaction clutches.

The input shaft 17 is continuously connected with the ring gear member 24, and the output shaft 19 is continuously connected with the ring gear member 44. An interconnecting member 70 continuously interconnects the planet carrier assembly member 36 with the planet carrier assembly member 46. The sun gear member 22 is continuously connected with the transmission housing 60 (i.e., a stationary member).

The planet carrier assembly member 26 is selectively connectable with the sun gear member 42 through the clutch 50. The ring gear member 24 is selectively connectable with the sun gear member 42 through the clutch 52. The sun gear member 32 is selectively connectable with the transmission housing 60 through the brake 54. The planet carrier assembly member 26 is selectively connectable with the sun gear member 32 through the clutch 56. The ring gear member 24 is selectively connectable with the planet carrier assembly member 46 through the clutch 58. The planet carrier assembly member 36 is selectively connectable with the transmission housing 60 through the clutch 59.

The appended claims refer to first, second and third members, which are the ring gear member, planet carrier assembly member, and sun gear member of the gear sets, respectively, in the preferred embodiment.

As shown in the truth table (i.e., clutching table) of FIG. 3a, the torque-transmitting mechanisms 50, 52, 54, 56, 58, 59 are selectively engaged in combinations of two to provide seven forward speed ratios and one reverse speed ratio. It should also be noted in the truth table that the torque-transmitting mechanism 59 remains engaged through the neutral condition, thereby simplifying the forward/reverse interchange.

To establish the reverse speed ratio, the clutch 56 and brake 59 are engaged. The clutch 56 connects the planet carrier assembly member 26 with the sun gear member 32, and the brake 59 connects the planet carrier assembly member 36 with the transmission housing 60. As illustrated in the truth table of FIG. 3a, the overall numerical value of the reverse speed ratio is −2.612.

The first forward speed ratio is established with the engagement of the clutch 50 and the brake 59. The clutch 50 connects the planet carrier assembly member 26 with the sun gear member 42, and the brake 59 connects the planet carrier assembly member 36 with the transmission housing 60. The overall numerical value of the first forward speed ratio is 4.129, as indicated in the truth table.

The second forward speed ratio is established with the engagement of the clutch 52 and brake 59. The clutch 52 connects the ring gear member 24 with the sun gear member 42, and the brake 59 connects the planet carrier assembly member 36 with the transmission housing 60. The overall numerical value of the second forward speed ratio is 2.548, as indicated in the truth table.

The third forward speed ratio is established with the engagement of the clutch 52 and brake 54. The clutch 52 connects the ring gear member 24 with the sun gear member 42, and the brake 54 connects the sun gear member 32 with the transmission housing 60. The overall numerical value of the third forward speed ratio is 1.593, as indicated in the truth table.

The fourth forward speed ratio is established with the engagement of the clutches 52, 56. Again, the clutch 52 connects the ring gear member 24 with the sun gear member 42, and the clutch 56 connects the planet carrier assembly member 26 with the sun gear member 32. The overall numerical value of the fourth forward speed ratio is 1.166, as indicated in the truth table.

The fifth forward speed ratio is established with the engagement of the clutches 52, 58. The clutch 52 connects the ring gear member 24 with the sun gear member 42, and the clutch 58 connects the ring gear member 24 with the planet carrier assembly member 46. In this configuration, the input shaft 17 is directly connected to the output shaft 19, so the overall numerical value of the fifth forward speed ratio is 1, as indicated in the truth table.

The sixth forward speed ratio is established with the engagement of the clutches 56, 58. The clutch 56 connects the planet carrier assembly member 26 with the sun gear member 32, and the clutch 58 connects the ring gear member 24 with the planet carrier assembly member 46. The overall numerical value of the sixth forward speed ratio is 0.808, as indicated in the truth table.

The seventh forward speed ratio is established with the engagement of the brake 54 and clutch 58. The brake 54 connects the sun gear member 32 with the transmission housing 60, and the clutch 58 connects the ring gear member 24 with the planet carrier assembly member 46. The numerical value of the seventh forward speed ratio is 0.617, as indicated in the truth table.

As set forth above, the engagement schedules for the torque-transmitting mechanisms are shown in the truth table of FIG. 3a. This truth table also provides an example of speed ratios that are available utilizing the ring gear/sun gear tooth ratios given by way of example in the R/S Ratios table of FIG. 3b. The R1/S1 ratio is the ring gear/sun gear tooth ratio of the planetary gear set 20 (i.e., the tooth count of ring gear 24 divided by the tooth count of sun gear 22); the R2/S2 ratio is the ring gear/sun gear tooth ratio of the planetary gear set 30; and the R3/S3 ratio is the ring gear/sun gear tooth ratio of the planetary gear set 40. Also, the truth table of FIG. 3a describes the ratio steps that can be attained utilizing the sample of tooth ratios given. For example, the step ratio between the first and second forward ratios is 1.62, while the step ratio between the reverse and first forward ratio is −0.63. It can also be readily determined from the truth table of FIG. 3 that all of the single step forward ratio interchanges are of the single transition variety.

The torque-transmitting mechanism engagement sequence described above results in minimization of gear loading, which significantly improves pitting, and extends gear and bearing life. It may also improve input engine speed capability by reducing input pinion to carrier speeds, and reduces spins losses of associated bearings.

The stick diagram of FIG. 2 shows the clutch 52 positioned between the first and second planetary gear sets 20, 30. However, as an alternative, the clutch 52 could be positioned to the left of the planetary gear set 20.

FIGS. 4a and 4b show a truth table and a ring gear/sun gear ratio table, respectively, for an alternative embodiment of the invention which corresponds with the diagrams of FIGS. 1 and 2, but has different tooth counts to provide different ratios. The engagement schedules for the torque-transmitting mechanisms shown in the truth table of FIG. 4a are the same as that shown in FIG. 3a. FIG. 4a also provides speed ratios that are available utilizing the ring gear/sun gear tooth ratios given by way of example in the R/S Ratios table of FIG. 4b. The R1/S1 ratio is the ring gear/sun gear tooth ratio of the planetary gear set 20 (i.e., the tooth count of ring gear 24 divided by the tooth count of sun gear 22); the R2/S2 ratio is the ring gear/sun gear tooth ratio of the planetary gear set 30; and the R3/S3 ratio is the ring gear/sun gear tooth ratio of the planetary gear set 40. Also, the truth table of FIG. 4a describes the ratio steps that can be attained utilizing the tooth ratios given. For example, the step ratio between the first and second forward ratios is 1.494, while the step ratio between the reverse and first forward ratio is −0.87.

Other tooth counts may be implemented within the scope of the present invention to achieve different ratios.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input shaft;
   an output shaft;
   a planetary gear arrangement having first, second and third planetary gear sets, each planetary gear set having first, second and third members;
   said input shaft being continuously interconnected with said first member of said first planetary gear set, and said output shaft being continuously interconnected with said first member of said third planetary gear set;
   said first member of said second planetary gear set being integrally connected with said first member of said third planetary gear set; and said third member of said first planetary gear set being continuously connected with a transmission housing;
   an interconnecting member continuously interconnecting said second member of said second planetary gear set with said second member of said third planetary gear set;
   a first torque-transmitting mechanism selectively interconnecting said second member of said first planetary gear set with said third member of said third planetary gear set;
   a second torque-transmitting mechanism selectively interconnecting said first member of said first planetary gear set with said third member of said third planetary gear set;
   a third torque-transmitting mechanism selectively interconnecting said third member of said second planetary gear set with said transmission housing;

a fourth torque-transmitting mechanism selectively interconnecting said second member of said first planetary gear set with said third member of said second planetary gear set;

a fifth torque-transmitting mechanism selectively interconnecting said first member of said first planetary gear set with said second member of said third planetary gear set; and a sixth torque-transmitting mechanism selectively interconnecting said second member of said second planetary gear set with said transmission housing;

wherein a first forward speed ratio is established with the engagement of said first and sixth torque-transmitting mechanisms; a second forward speed ratio is established with the engagement of said second and sixth torque-transmitting mechanisms; a third forward speed ratio is established with the engagement of said second and third torque-transmitting mechanisms; a fourth forward speed ratio is established with the engagement of said second and fourth torque-transmitting mechanisms; a fifth forward speed ratio is established with the engagement of said second and fifth torque-transmitting mechanisms; a sixth forward speed ratio is established with the engagement of said fourth and fifth torque-transmitting mechanisms; and a seventh forward speed ratio is established with the engagement of said third and fifth torque-transmitting mechanisms.

2. The transmission of claim 1, wherein said first member of said second planetary gear set and said first member of said third planetary gear set comprise a single elongated ring gear.

3. The transmission of claim 1, wherein said first and second planetary gear sets are simple planetary gear sets, and said third planetary gear set is a compound planetary gear set.

4. The transmission of claim 1, wherein each of said first members is a ring gear, each of said second members is a planet carrier assembly member, and each of said third members is a sun gear.

5. The transmission of claim 1, wherein said first, second, fourth and fifth torque-transmitting mechanisms comprise rotating clutches, and said third and sixth torque-transmitting mechanisms comprise brakes.

6. The transmission of claim 1, wherein said fifth forward speed ratio is a 1:1 ratio.

7. The transmission of claim 4, wherein said ring gear of said first planetary gear set has 79 teeth; said sun gear of said first planetary gear set has 49 teeth; said ring gear of said second planetary gear set has 79 teeth; said sun gear of said second planetary gear set has 49 teeth; said ring gear of said third planetary gear set has 79 teeth; and said sun gear of said third planetary gear set has 31 teeth.

8. The transmission of claim 4, wherein said ring gear of said first planetary gear set has 79 teeth; said sun gear of said first planetary gear set has 39 teeth; said ring gear of said second planetary gear set has 79 teeth; said sun gear of said second planetary gear set has 45 teeth; said ring gear of said third planetary gear set has 79 teeth; and said sun gear of said third planetary gear set has 39 teeth.

9. A multi-speed transmission comprising:
an input shaft;
an output shaft;
a planetary gear arrangement having first, second and third planetary gear sets, each planetary gear set having a ring gear, a planet carrier assembly member, and a sun gear;

said input shaft being continuously interconnected with said ring gear of said first planetary gear set, and said output shaft being continuously interconnected with said ring gear of said third planetary gear set;

said ring gear of said second planetary gear set being integrally connected with said ring gear of said third planetary gear set; and said sun gear of said first planetary gear set being continuously connected with a transmission housing;

an interconnecting member continuously interconnecting said planet carrier assembly member of said second planetary gear set with said planet carrier assembly member of said third planetary gear set;

a first torque-transmitting mechanism selectively interconnecting said planet carrier assembly member of said first planetary gear set with said sun gear of said third planetary gear set;

a second torque-transmitting mechanism selectively interconnecting said ring gear of said first planetary gear set with said sun gear of said third planetary gear set;

a third torque-transmitting mechanism selectively interconnecting said sun gear of said second planetary gear set with said transmission housing;

a fourth torque-transmitting mechanism selectively interconnecting said planet carrier assembly member of said first planetary gear set with said sun gear of second planetary gear set;

a fifth torque-transmitting mechanism selectively interconnecting said ring gear of said first planetary gear set with said planet carrier assembly member of said third planetary gear set;

a sixth torque-transmitting mechanism selectively interconnecting said planet carrier assembly member of said second planetary gear set with said transmission housing; and wherein a first forward speed ratio is established with the engagement of said first and sixth torque-transmitting mechanisms; a second forward speed ratio is established with the engagement of said second and sixth torque-transmitting mechanisms; a third forward speed ratio is established with the engagement of said second and third torque-transmitting mechanisms; a fourth forward speed ratio is established with the engagement of said second and fourth torque-transmitting mechanisms; a fifth forward speed ratio is established with the engagement of said second and fifth torque-transmitting mechanisms; a sixth forward speed ratio is established with the engagement of said fourth and fifth torque-transmitting mechanisms; and a seventh forward speed ratio is established with the engagement of said third and fifth torque-transmitting mechanisms.

10. The transmission of claim 9, wherein said ring gear of said second planetary gear set and said ring gear of said third planetary gear set comprise a single elongated ring gear.

11. The transmission of claim 9, wherein said first and second planetary gear sets are simple planetary gear sets, and said third planetary gear set is a compound planetary gear set.

12. The transmission of claim 9, wherein said first, second, fourth and fifth torque-transmitting mechanisms comprise rotating clutches, and said third and sixth torque-transmitting mechanisms comprise brakes.

13. The transmission of claim 9, wherein said fifth forward speed ratio is a 1:1 ratio.

14. The transmission of claim 9, wherein said ring gear of said first planetary gear set has 79 teeth; said sun gear of said first planetary gear set has 49 teeth; said ring gear of said second planetary gear set has 79 teeth; said sun gear of said second planetary gear set has 49 teeth; said ring gear of said third planetary gear set has 79 teeth; and said sun gear of said third planetary gear set has 31 teeth.

15. The transmission of claim 9, wherein said ring gear of said first planetary gear set has 79 teeth; said sun gear of said first planetary gear set has 39 teeth; said ring gear of said second planetary gear set has 79 teeth; said sun gear of said second planetary gear set has 45 teeth; said ring gear of said third planetary gear set has 79 teeth; and said sun gear of said third planetary gear set has 39 teeth.

16. A multi-speed transmission comprising:
   an input shaft;
   an output shaft;
   a planetary gear arrangement having first, second and third planetary gear sets, each planetary gear set having a ring gear, a planet carrier assembly member, and a sun gear;
   wherein said first and second planetary gear sets are simple planetary gear sets, and said third planetary gear set is a compound planetary gear set;
   said input shaft being continuously interconnected with said ring gear of said first planetary gear set, and said output shaft being continuously interconnected with said ring gear of said third planetary gear set;
   said ring gear of said second planetary gear set being integrally connected with said ring gear of said third planetary gear set; and said sun gear of said first planetary gear set being continuously connected with a transmission housing;
   an interconnecting member continuously interconnecting said planet carrier assembly member of said second planetary gear set with said planet carrier assembly member of said third planetary gear set;
   a first torque-transmitting mechanism selectively interconnecting said planet carrier assembly member of said first planetary gear set with said sun gear of said third planetary gear set;
   a second torque-transmitting mechanism selectively interconnecting said ring gear of said first planetary gear set with said sun gear of said third planetary gear set, wherein said second torque-transmitting mechanism is positioned between said first and second planetary gear sets;
   a third torque-transmitting mechanism selectively interconnecting said sun gear of said second planetary gear set with said transmission housing;
   a fourth torque-transmitting mechanism selectively interconnecting said planet carrier assembly member of said first planetary gear set with said sun gear of said second planetary gear set;
   a fifth torque-transmitting mechanism selectively interconnecting said ring gear of said first planetary gear set with said planet carrier assembly member of said third planetary gear set;
   a sixth torque-transmitting mechanism selectively interconnecting said planet carrier assembly member of said second planetary gear set with said transmission housing;
   wherein a first forward speed ratio is established with the engagement of said first and sixth torque-transmitting mechanisms; a second forward speed ratio is established with the engagement of said second and sixth torque-transmitting mechanisms; a third forward speed ratio is established with the engagement of said second and third torque-transmitting mechanisms; a fourth forward speed ratio is established with the engagement of said second and fourth torque-transmitting mechanisms; a fifth forward speed ratio is established with the engagement of said second and fifth torque-transmitting mechanisms; a sixth forward speed ratio is established with the engagement of said fourth and fifth torque-transmitting mechanisms; and a seventh forward speed ratio is established with the engagement of said third and fifth torque-transmitting mechanisms; and
   wherein said ring gear of said first planetary gear set has 79 teeth; said sun gear of said first planetary gear set has 39 teeth; said ring gear of said second planetary gear set has 79 teeth; said sun gear of said second planetary gear set has 45 teeth; said ring gear of said third planetary gear set has 79 teeth; and said sun gear of said third planetary gear set has 39 teeth.

17. The transmission housing of claim 16, wherein said first, second, fourth and fifth torque-transmitting mechanisms comprise rotating clutches, and said third and sixth torque-transmitting mechanisms comprise brakes.

18. The transmission of claim 16, wherein said planet carrier assembly member of said second planetary gear set is continuously connected with said planet carrier assembly member of said third planetary gear set.

* * * * *